(12) United States Patent
Oguro et al.

(10) Patent No.: US 11,027,728 B2
(45) Date of Patent: Jun. 8, 2021

(54) VEHICLE CONTROL DEVICE

(71) Applicant: HONDA MOTOR CO., LTD., Tokyo (JP)

(72) Inventors: Hiroshi Oguro, Wako (JP); Daichi Kato, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 161 days.

(21) Appl. No.: 16/337,622

(22) PCT Filed: Sep. 1, 2017

(86) PCT No.: PCT/JP2017/031554
§ 371 (c)(1),
(2) Date: Mar. 28, 2019

(87) PCT Pub. No.: WO2018/061613
PCT Pub. Date: Apr. 5, 2018

(65) Prior Publication Data
US 2020/0031342 A1    Jan. 30, 2020

(30) Foreign Application Priority Data
Sep. 30, 2016 (JP) .............................. JP2016-193727

(51) Int. Cl.
| | |
|---|---|
| *B60W 30/095* | (2012.01) |
| *G06T 7/73* | (2017.01) |
| *B60W 30/09* | (2012.01) |
| *G06K 9/00* | (2006.01) |
| *G08G 1/16* | (2006.01) |

(Continued)

(52) U.S. Cl.
CPC ........ *B60W 30/0956* (2013.01); *B60W 30/09* (2013.01); *G06K 9/00805* (2013.01); *G06T 7/73* (2017.01); *G08G 1/16* (2013.01); *B60W 10/04* (2013.01); *B60W 10/18* (2013.01); *B60W 10/20* (2013.01); *B60W 2554/00* (2020.02); *G06T 2207/30261* (2013.01)

(58) Field of Classification Search
CPC ............ B60W 30/0956; B60W 30/09; B60W 2554/00; B60W 10/04; B60W 10/18; B60W 10/20; G06T 7/73; G06T 2207/30261; G06K 9/00805; G08G 1/16
See application file for complete search history.

(56) References Cited

U.S. PATENT DOCUMENTS

| | | | |
|---|---|---|---|
| 10,387,733 B2 * | 8/2019 | Yokota ................... | G08G 1/166 |
| 2015/0219761 A1 * | 8/2015 | Inomata ................. | G08G 1/166 |
| | | | 701/301 |

FOREIGN PATENT DOCUMENTS

| | | |
|---|---|---|
| JP | 2011-076527 A | 4/2011 |
| JP | 2013-097392 A | 5/2013 |

OTHER PUBLICATIONS

PCT/ISA/210 from International Application PCT/JP2017/031554 and the English translation thereof.

* cited by examiner

*Primary Examiner* — Marthe Y Marc-Coleman
(74) *Attorney, Agent, or Firm* — Carrier Blackman & Associates, P.C.; Joseph P. Carrier; Jeffrey T. Gedeon

(57) ABSTRACT

An integrated object formation unit of a vehicle control device forms integrated objects, which are integral objects, the boundaries of the integrated objects being determined from the positional relationship between two or ore objects in a prescribed distance range. An interference prediction unit of the vehicle control device predicts the probability of the integrated objects, instead of each of the objects, coming into contact with, or near, a vehicle.

14 Claims, 15 Drawing Sheets

(51) Int. Cl.
*B60W 10/04* (2006.01)
*B60W 10/18* (2012.01)
*B60W 10/20* (2006.01)

VEHICLE CONTROL DEVICE

TECHNICAL FIELD

The present invention relates to a vehicle control device (vehicle control apparatus) that recognizes objects in an outside state of a vehicle and controls the behavior of the vehicle based on the result of recognition.

BACKGROUND ART

Vehicle control apparatuses that recognize objects in the outside state of a vehicle and control the behavior of the vehicle based on the result of recognition are known. For example, various techniques for effectively responding to multiple objects that were recognized at a time have been proposed.

Japanese Laid-Open Patent Publication No. 2011-076527 (Abstract and [0036], for instance) proposes a driving safety apparatus which groups moving objects located close to each other and moving at speeds close to each other together and gives a notification only once for each group when there is a possibility of their contact with or approach to a vehicle (hereinafter, interference). This can decrease the frequency of alarm activation and reduce annoyance to a driver.

Paragraph [0046] of Japanese Laid-Open Patent Publication No. 2011-076527 describes calculating a Time To Collision (TTC) for each of moving objects that make up a group and determining the possibility of interference using the smallest TTC as a representative value for that group.

SUMMARY OF INVENTION

The technique proposed by Japanese Laid-Open Patent Publication No. 2011-076527, however, does not take into account the positional relationship between multiple objects making up a group, for example, because it predicts interference potential using a representative evaluation value (here, TTC) of a group. Thus, there is still enough room for improvement in terms of the granularity of prediction regarding interference potential.

The present invention was made to solve the aforementioned problem, and an object thereof is to provide a vehicle control apparatus capable of performing fine-granularity prediction of interference potential while taking advantage of the convenience of grouping objects together.

A vehicle control apparatus according to the present invention is an apparatus including: an outside state detection unit configured to detect an outside state of a vehicle; an object recognition unit configured to recognize one or more objects based on a detection result obtained by the outside state detection unit; and an interference potential prediction unit configured to predict a possibility that the one or more objects recognized by the object recognition unit contact or approach the vehicle, wherein the vehicle control apparatus further includes a unified object forming unit configured to form as an integrated item, a unified object, a boundary of which is determined from positional relationship between two or more objects that are present within a predetermined distance range among the plurality of objects recognized by the object recognition unit, and the interference potential prediction unit is configured to predict a possibility that the unified object formed by the unified object forming unit contacts or approaches the vehicle, instead of the respective objects that make up the unified object.

Such a configuration enables prediction of the possibility of interference with the vehicle (contact or approach) using a unified object having a boundary that takes into account the positional relationship between two or more objects present in the predetermined distance range. This allows for fine-granularity prediction of interference potential while taking advantage of the convenience of grouping objects together.

The unified object forming unit may also be configured to set the predetermined distance range in accordance with a geometry of the vehicle and form the unified object. Fine-granularity prediction can be performed given the trend that the result of determination as to whether the vehicle can pass through the clearance between objects or not varies depending on the geometry of the vehicle.

The unified object forming unit may also be configured to define a plurality of circle regions having a same radius and centered at positions of the respective objects, and form the unified object by unifying together two or more objects that have an overlapping portion of the circle regions. This enables objects to be grouped together by a simple computation method.

The unified object forming unit may also be configured to form the unified object that encompasses all of two or more objects present in the predetermined distance range and has a polygon shape. As the boundary of a polygon is an aggregate of multiple straight line components, the amount of computation required for determining the interference potential is reduced.

The unified object forming unit may also be configured to extract representative objects from the two or more objects making up the unified object at predetermined angle intervals with respect to an angular direction centered at a position of the vehicle, and determine at least two vertices to form the polygon from positions of the representative objects. This allows polygon vertices to be arranged at positions located at the predetermined angle intervals.

The unified object forming unit may also be configured to set the predetermined angle interval in accordance with a detection performance of the outside state detection unit and determine at least two vertices to form the polygon. Polygon vertices can be arranged at appropriate positions given the trend that the detection resolution in the angular direction at which objects can be identified from each other varies depending on the detection performance of the outside state detection unit.

The unified object forming unit may also be configured to extract an object located relatively close to the vehicle from the two or more objects making up the unified object as a representative object and determine at least one vertex to form the polygon from a position of the representative object. This can incorporate the presence of an object that is of great interest in terms of the positional relationship with the vehicle into the shape of the boundary of the polygon.

The unified object forming unit may also be configured to determine points that are respectively on circles centered at the positions of the representative objects and that are closest to the position of the vehicle as vertices of the polygon. This can provide a boundary capable of covering the entire distance range in which two or more objects are present (the near side from the vehicle) and can also keep the distance between each representative object and the boundary at a predetermined value (the radius of the circle) or greater without fail.

The unified object forming unit may also be configured to determine as a vertex of the polygon, a point that is on the circle centered at the position of each of the representative objects corresponding to an extreme end in the angular direction and that is at a position representing either a largest angle or a smallest angle. This can provide a boundary capable of covering the entire angle range in which two or more objects are present and can also keep the distance between each representative object and the boundary at a predetermined value (the radius of the circle) or greater without fail.

When a plurality of vertices of the polygon are present on the circle centered at the position of the representative object corresponding to the extreme end in the angular direction, the unified object forming unit may also be configured to determine one or more interpolation points obtained by interpolating between neighboring vertices in an arc shape as vertices of the polygon. This can suppress formation of a portion with a shorter distance between the representative object and a partial boundary from the perspective of angle resolution.

The unified object forming unit may also be configured to determine at least one point that is on a far side relative to the positions of all objects that make up the unified object as a vertex of the polygon. This provides a boundary capable of covering the entire distance range in which two or more objects are present (the far side from the vehicle).

The unified object forming unit may also be configured to determine as a vertex of the polygon, a point that is on a straight line connecting between the position of the representative object corresponding to the extreme end in the angular direction and the position of the vehicle and that is located on the far side at a predetermined length from the position of the representative object. This provides a boundary capable of covering the entire angle range in which two or more objects are present (here, the far side from the vehicle).

When a point that is located on the far side at a predetermined length from the position of the representative object lies on a lane on which the vehicle is to travel, the unified object forming unit may also be configured to determine another point that does not lie on the lane as a vertex of the polygon by decreasing the predetermined length. This can prevent the range defined by a boundary from unnecessarily expanding to another portion on the lane.

The interference potential prediction unit may also be configured to predict the possibility of contact with or approach to the vehicle from a positional relationship between the vehicle and a portion of the boundary of the unified object, the portion facing the vehicle. Using a portion of the boundary of the unified object that is most effective for the determination of interference potential, computation time is shortened and the determination can be completed correspondingly earlier.

The vehicle control apparatus may further include a vehicle control unit configured to control a behavior of the vehicle in accordance with a prediction result obtained by the interference potential prediction unit.

The vehicle control apparatus according to the present invention is capable of performing fine-granularity prediction of interference potential while taking advantage of the convenience of grouping objects together.

DESCRIPTION OF EMBODIMENTS

The vehicle control apparatus according to the present invention is described below by showing preferred embodiments with reference to the accompanying drawings.

Configuration of Vehicle Control Apparatus 10

Overall Configuration

Figure 1:
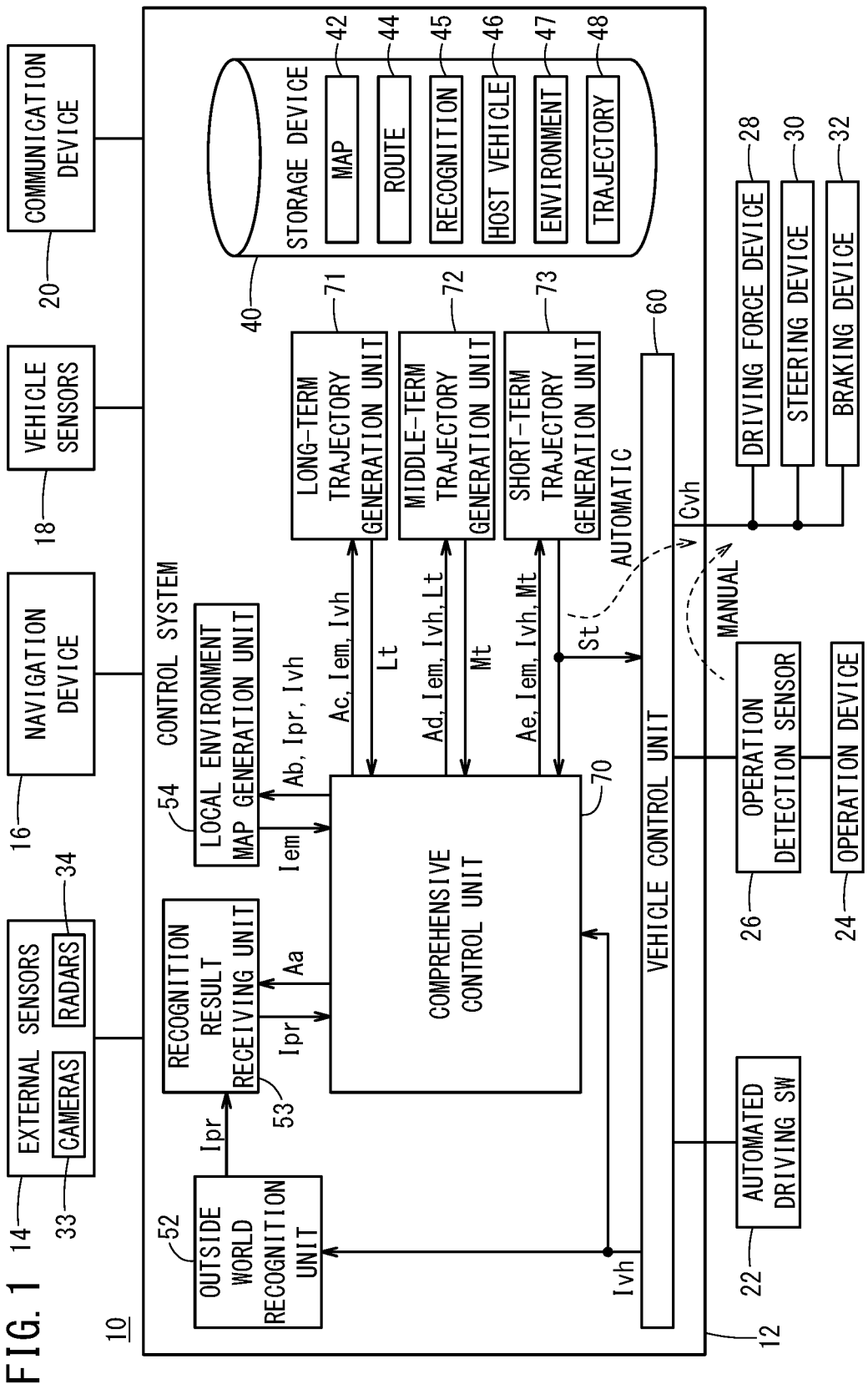
FIG. 1 is a block diagram showing a configuration of a vehicle control apparatus according to an embodiment of the present invention.

FIG. 1 is a block diagram showing a configuration of a vehicle control apparatus 10 according to an embodiment of the present invention. The vehicle control apparatus 10 is incorporated in a vehicle 100 (FIG. 4, for instance) and configured to be capable of executing automated driving of the vehicle 100 or automated driving assistance. The vehicle control apparatus 10 includes a control system 12, an input device, and an output device. The input device and the output device are each connected with the control system 12 through a communication line.

The input device includes external sensors 14, a navigation device 16, vehicle sensors 18, a communication device 20, an automated driving switch 22, and an operation detection sensor 26 connected with an operation device 24.

The output device includes a driving force device 28 for driving wheels (not shown), a steering device 30 for steering the wheels, and a braking device 32 for braking the wheels.

Specific Configuration of Input Device

The external sensors 14 include multiple cameras 33 and multiple radars 34 for obtaining information indicating outside states of the vehicle 100 (hereinafter outside information) and output the outside information obtained to the control system 12. The external sensors 14 may further include multiple LIDAR (Light Detection and Ranging/Laser Imaging Detection and Ranging) devices.

The navigation device 16 includes a satellite positioning device capable of detecting the current position of the vehicle 100, and user interfaces (for example, a touch panel display, a speaker, and a microphone). The navigation device 16 calculates a route to a specified destination based on the current position of the vehicle 100 or a user-specified position and outputs the route to the control system 12. The route calculated by the navigation device 16 is stored in a route information storage unit 44 of a storage device 40 as route information.

The vehicle sensors 18 include a speed sensor for detecting the speed of the vehicle 100 (the vehicle speed), an acceleration sensor for detecting an acceleration, a lateral G sensor for detecting lateral G, a yaw rate sensor detecting an angular velocity about a vertical axis, an orientation sensor for detecting orientation or direction, and an inclination sensor for detecting an inclination, and outputs the detection signals from those sensors to the control system 12. The detection signals are stored in a host vehicle state information storage unit 46 of the storage device 40 as host vehicle state information Ivh.

The communication device 20 is configured to be capable of communication with external devices including roadside equipment, other vehicles, and servers, and sends and receives information on traffic equipment, information on other vehicles, probe information, or the latest map information, for example. The map information is stored in the navigation device 16 and also in a map information storage unit 42 of the storage device 40 as map information.

The operation device 24 includes an accelerator pedal, a steering wheel (a car steering wheel), a brake pedal, a shift lever, and a direction indication lever. The operation device 24 is equipped with the operation detection sensor 26 for detecting whether an operation is being performed by the driver or not, the amount of operation, and the position of operation.

The operation detection sensor 26 outputs the amount of accelerator pressing (accelerator opening), the amount of steering wheel operation (the amount of steering), the amount of brake pressing, the shift position, a right or left turn direction, and the like to a vehicle control unit 60 as detection results.

The automated driving switch 22 is, for example, a push button switch provided on an instrument panel for users including the driver to switch between a non-automated driving mode (manual driving mode) and an automated driving mode by manual operation.

In this embodiment, settings are such that the mode is switched between the automated driving mode and the non-automated driving mode every time the automated driving switch 22 is pressed. Alternatively, for more reliable confirmation of the driver's intention for automated driving, settings may be such that the mode switches from the non-automated driving mode to the automated driving mode when the automated driving switch 22 is pressed twice and from the automated driving mode to the non-automated driving mode when it is pressed once, for example.

The automated driving mode is a driving mode in which the vehicle 100 travels under control of the control system 12 without the driver manipulating the operation device 24 (specifically, the accelerator pedal, the steering wheel, and the brake pedal). In other words, the automated driving mode is a driving mode in which the control system 12 controls some or all of the driving force device 28, the steering device 30, and the braking device 32 based on a sequentially determined action plan (in a short term, a short-term trajectory St as discussed later).

If the driver starts manipulating the operation device 24 during the automated driving mode, the automated driving mode is automatically canceled to switch to the non-automated driving mode (manual driving mode).

Specific Configuration of Output Device

The driving force device 28 is composed of a driving force electronic control unit (ECU) and a driving source including an engine and a traction motor. The driving force device 28 generates travel driving force (torque) for the traveling of the vehicle 100 in accordance with a vehicle control value Cvh input from the vehicle control unit 60 and transmits the force to the wheels via a transmission or directly.

The steering device 30 is composed of an electric power steering system (EPS) ECU and an EPS device. The steering device 30 changes the orientation of the wheels (drive wheels) in accordance with the vehicle control value Cvh input from the vehicle control unit 60.

The braking device 32 is an electric servo brake used in conjunction with a hydraulic brake, for example, and is composed of a brake ECU and a brake actuator. The braking device 32 brakes the wheels in accordance with the vehicle control value Cvh input from the vehicle control unit 60.

Configuration of Control System 12

The control system 12 is composed of one or more ECUs and includes various functional components as well as the storage device 40 and the like. The functional components in this embodiment are software functional components whose functions are implemented by execution of programs stored in the storage device 40 by a central processing unit (CPU); however, they may be implemented in hardware functional components composed of an integrated circuit and the like.

The control system 12 includes, in addition to the storage device 40 and the vehicle control unit 60, an outside world recognition unit 52, a recognition result receiving unit 53, a local environment map generation unit 54, a comprehensive control unit 70, a long-term trajectory generation unit 71, a middle-term trajectory generation unit 72, and a short-term trajectory generation unit 73. The comprehensive control unit 70 centrally controls the individual units by controlling task synchronization among the recognition result receiving unit 53, the local environment map generation unit 54, the long-term trajectory generation unit 71, the middle-term trajectory generation unit 72, and the short-term trajectory generation unit 73.

The outside world recognition unit 52, with reference to the host vehicle state information Ivh from the vehicle control unit 60, recognizes lane marking (white lines) on the opposite sides of the vehicle 100 based on outside information (including image information) from the external sensors 14, and generates "static" outside world recognition information, including the distance to a stop line and a travel-available region. At the same time, the outside world recognition unit 52 also generates "dynamic" outside world recognition information such as on obstacles (including parked or stopped vehicles), traffic participants (persons and other vehicles), and traffic light colors {blue (green), yellow (orange), red}, based on outside information from the external sensors 14.

The static and dynamic outside world recognition information are each stored in an outside world recognition information storage unit 45 of the storage device 40 as outside world recognition information Ipr.

The recognition result receiving unit 53, in response to a computation command Aa, outputs the outside world recognition information Ipr it has received within a predetermined computation cycle Toc (the reference cycle or reference computation cycle) to the comprehensive control unit 70 with the count value of an update counter. The computation cycle Toc is the reference computation cycle within the control system 12, being set to a value on the order of several tens of milliseconds (ms), for example.

The local environment map generation unit 54, in response to a computation command Ab from the comprehensive control unit 70, generates local environment map information Iem within the computation cycle Toc with reference to the host vehicle state information Ivh and outside world recognition information Ipr, and outputs the local environment map information Iem to the comprehensive control unit 70 with the count value of an update counter. That is to say, at the start of control, a computation cycle of 2×Toc is required before the local environment map information Iem is generated.

Roughly speaking, the local environment map information Iem is information that combines the host vehicle state information Ivh with the outside world recognition information Ipr. The local environment map information Iem is stored in a local environment map information storage unit 47 of the storage device 40.

The long-term trajectory generation unit 71, in response to a computation command Ac from the comprehensive control unit 70, generates a long-term trajectory Lt in a relatively longest computation cycle (for example, 9×Toc) with reference to the local environment map information Iem (utilizing only the static components of the outside world recognition information Ipr), the host vehicle state information Ivh, and a road map (for example, the curvatures of curves) stored in the map information storage unit 42. Then, the long-term trajectory generation unit 71 outputs the generated long-term trajectory Lt to the comprehensive control unit 70 with the count value of an update counter. The long-term trajectory Lt is stored in a trajectory information storage unit 48 of the storage device 40 as trajectory information.

The middle-term trajectory generation unit 72, in response to a computation command Ad from the comprehensive control unit 70, generates a middle-term trajectory Mt within a relatively medium computation cycle (for example, 3×Toc) with reference to the local environment map information Iem (utilizing both the dynamic and static components of the outside world recognition information Ipr), the host vehicle state information Ivh, and the long-term trajectory Lt. Then, the middle-term trajectory generation unit 72 outputs the generated middle-term trajectory Mt to the comprehensive control unit 70 with the count value of an update counter. The middle-term trajectory Mt is stored in the trajectory information storage unit 48 as trajectory information like the long-term trajectory Lt.

The short-term trajectory generation unit 73, in response to a computation command Ae from the comprehensive control unit 70, generates a short-term trajectory St within a relatively shortest computation cycle (for example, Toc) with reference to the local environment map information Iem (utilizing both the dynamic and static components of the outside world recognition information Ipr), the host vehicle state information Ivh, and the middle-term trajectory Mt. Then, the short-term trajectory generation unit 73 outputs the generated short-term trajectory St to the comprehensive control unit 70 and to the vehicle control unit 60 simultaneously with the count value of an update counter. The short-term trajectory St is stored in the trajectory information storage unit 48 as trajectory information like the long-term trajectory Lt and middle-term trajectory Mt.

The long-term trajectory Lt indicates a trajectory for a traveling time of, for example, about 10 seconds, and is a trajectory that gives priority to the ride quality and comfort. The short-term trajectory St indicates a trajectory for a traveling time of, for example, about 1 second, and is a trajectory that gives priority to the achieving of vehicle dynamics and ensuring of safety. The middle-term trajectory Mt indicates a trajectory for a traveling time of, for example, about 5 seconds, and is an intermediate trajectory relative to the long-term trajectory Lt and the short-term trajectory St.

The short-term trajectory St is equivalent to a data set indicative of the target behavior of the vehicle 100 per short cycle Ts (=Toc). The short-term trajectory St is a trajectory point sequence (x, y, θz, Vs, Va, ρ, γ, δst) with the data unit being position x in the vertical direction (X-axis), position y in the horizontal direction (Y-axis), attitude angle θz, speed Vs, acceleration Va, curvature ρ, yaw rate γ, and steering angle δst, for example. The long-term trajectory Lt or the middle-term trajectory Mt is a data set defined in a similar manner to the short-term trajectory St, though with a different cycle.

The vehicle control unit 60 determines a vehicle control value Cvh that allows traveling of the vehicle 100 according to behaviors identified with the short-term trajectory St (a trajectory point sequence) and outputs the resulting vehicle control value Cvh to the driving force device 28, the steering device 30, and the braking device 32.

Key Features

Figure 2:
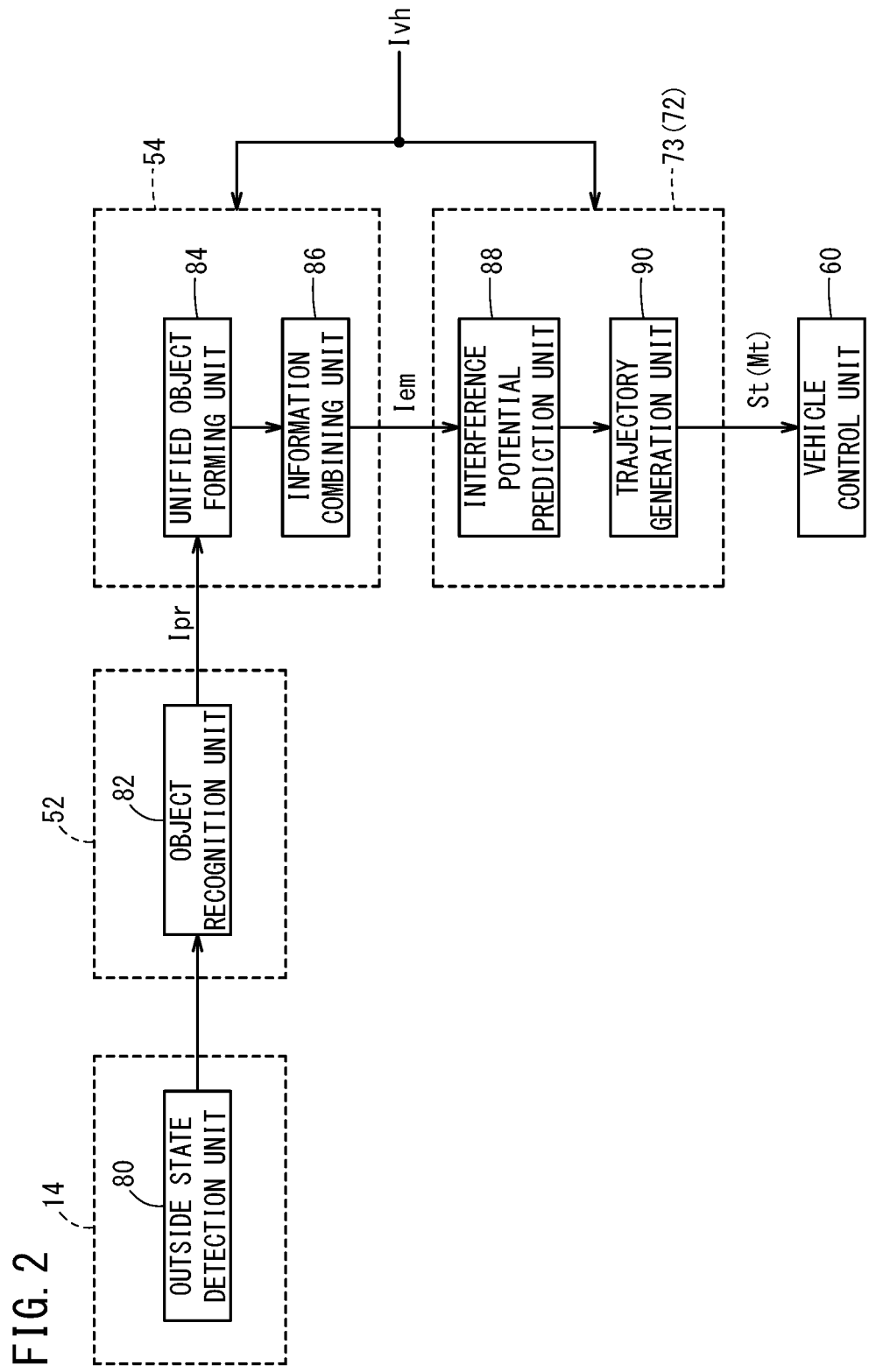
FIG. 2 is a functional block diagram showing key features of the vehicle control apparatus of FIG. 1.

FIG. 2 is a functional block diagram showing key features in the vehicle control apparatus 10 of FIG. 1. The vehicle control apparatus 10 includes an outside state detection unit 80, an object recognition unit 82, a unified object forming unit 84, an information combining unit 86, an interference potential prediction unit 88, a trajectory generation unit 90, and a vehicle control unit 60.

The outside state detection unit 80 corresponds to the external sensors 14 shown in FIG. 1 and detects the outside state of the vehicle 100. The object recognition unit 82 corresponds to the outside world recognition unit 52 shown in FIG. 1 and recognizes one or more objects by applying a well-known recognition technique to a detection result obtained by the outside state detection unit 80.

The unified object forming unit 84 and the information combining unit 86 correspond to the local environment map generation unit 54 shown in FIG. 1. The unified object forming unit 84 unifies particular objects out of multiple objects using the outside world recognition information Ipr, including the recognition result obtained by the object recognition unit 82, and the host vehicle state information Ivh associated with the vehicle 100. The information combining unit 86 combines outside world recognition information Ipr, including information on objects outside the vehicle 100 (hereinafter, object information) or information on lanes (hereinafter, traffic lane information), to create local environment map information Iem.

The interference potential prediction unit 88 and the trajectory generation unit 90 correspond to the short-term trajectory generation unit 73 (or the middle-term trajectory generation unit 72) shown in FIG. 1. The interference potential prediction unit 88 predicts the possibility that one or more objects contact or approach the vehicle 100 (also called "interference possibility" hereinbelow) using the local environment map information Iem and host vehicle state information Ivh. The trajectory generation unit 90 generates a travel trajectory for use in behavior control on the vehicle 100 in consideration of the prediction result obtained by the interference potential prediction unit 88.

Operation of Vehicle Control Apparatus 10

The vehicle control apparatus 10 in this embodiment is configured as described above. Next, the operation of the vehicle control apparatus 10 (the functional block diagram shown in FIG. 2 in particular) is described with reference to the flowchart of FIG. 3.

Figure 3:
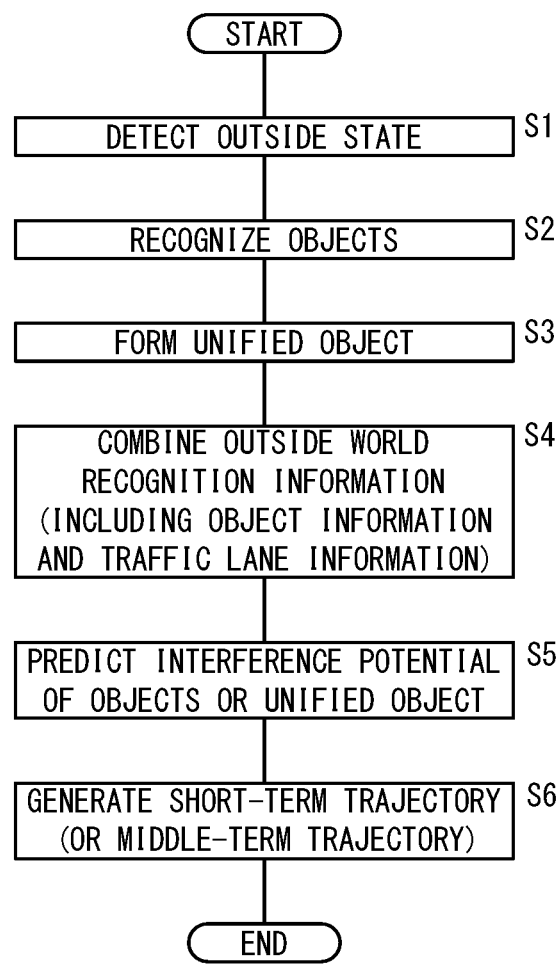
FIG. 3 is a flowchart for reference in description of the operation of the functional block diagram shown in FIG. 2.

At step S1 in FIG. 3, the outside state detection unit 80 (specifically, the cameras 33 or the radars 34) detects the outside state of the vehicle 100. In the following, a detection result obtained by the outside state detection unit 80 is described with reference to FIG. 4.

Figure 4:
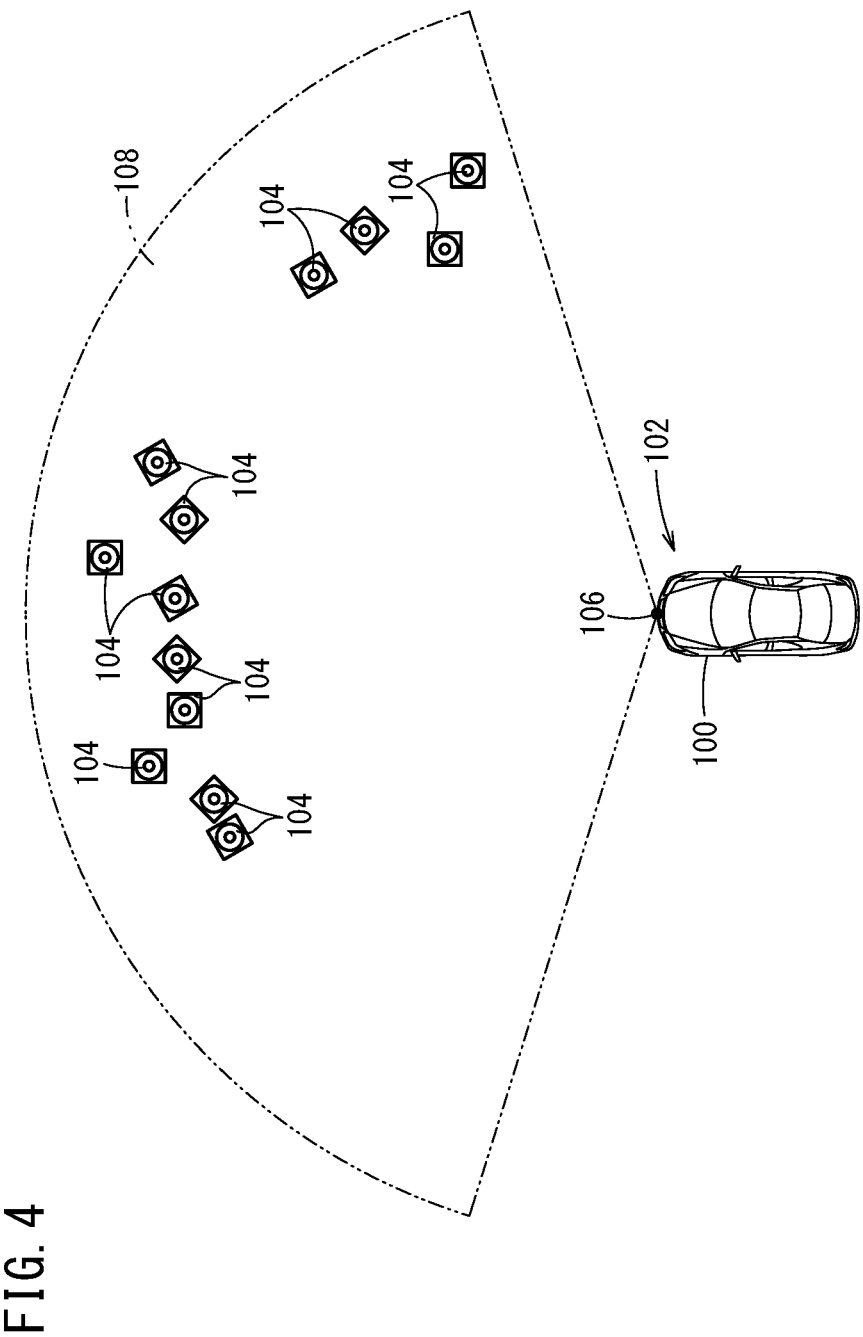
FIG. 4 is a diagram showing a result obtained from the detection process at step S1.

As shown in FIG. 4, multiple pylons 104 are placed around the vehicle 100 traveling on a lane 102. The region enclosed by a two-dot chain line indicates a region which has a substantially sector shape centered at a detection reference position 106 on the vehicle 100 and in which objects outside the vehicle 100 can be detected (called a detectable region 108 hereinbelow). In the example of this diagram, the outside state detection unit 80 detects 13 pylons 104 present in the detectable region 108.

At step S2 in FIG. 3, the object recognition unit 82 recognizes one or more objects (here, the 13 pylons 104) by applying a well-known recognition technique to the detection result at step S1. In the following, a recognition result obtained by the object recognition unit 82 is described with reference to FIG. 5.

Figure 5:
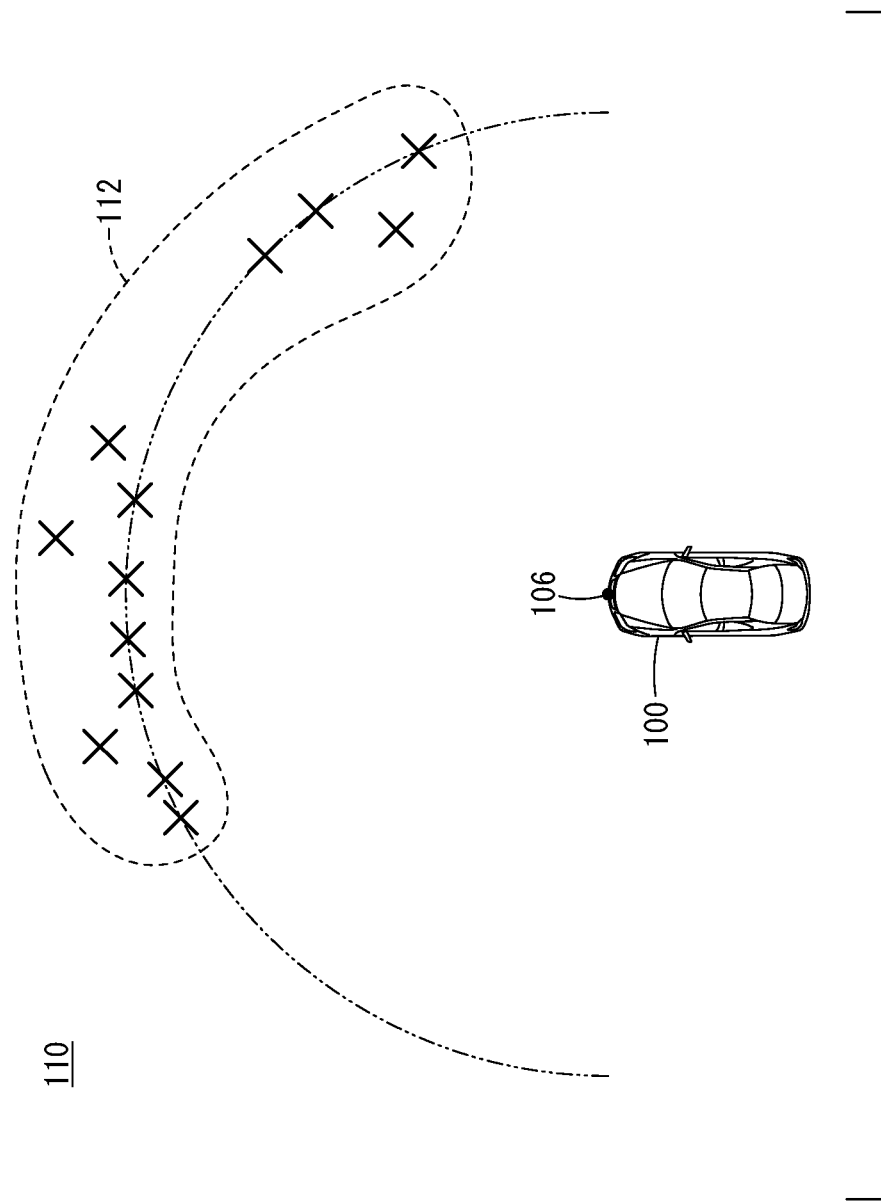
FIG. 5 is a diagram showing a result obtained from the recognition process at step S2.

A virtual space 110 shown in FIG. 5 is a planar space defined by a local coordinate system referenced to the position and attitude of the vehicle 100, for example. In the virtual space 110, the 13 pylons 104 (FIG. 4) are recognized as an object set 112. The arc indicated by a two-dot chain line indicates an equidistant curve from the detection reference position 106. That is, the 13 pylons 104 are all located at a substantially equal distance from the vehicle 100. In FIG. 5 and the subsequent diagrams, the shape of each object is sometimes indicated merely as a symbol (for example, "x" or "Δ") for convenience of description and illustration.

At step S3 in FIG. 3, the unified object forming unit 84 unifies particular objects in the object set 112 (one or more objects) recognized at step S2 to form a unified object U1, U2 as an integrated item. Specifically, the unified object forming unit 84 forms a unified object U1, U2 that encompasses all of the two or more objects present in a predetermined distance range and has a polygon shape. In the following, how the unified object U1, U2 may be formed is described in detail with reference to FIGS. 6A to 12.

[1] The unified object forming unit 84 first sets a predetermined distance range in accordance with the geometry of the vehicle 100. Specifically, the unified object forming unit 84 defines multiple circle regions 114 having a same radius R1 and centered at the positions of the respective objects, and groups two or more objects that have an overlapping portion 115, 116 together.

Figure 6A:
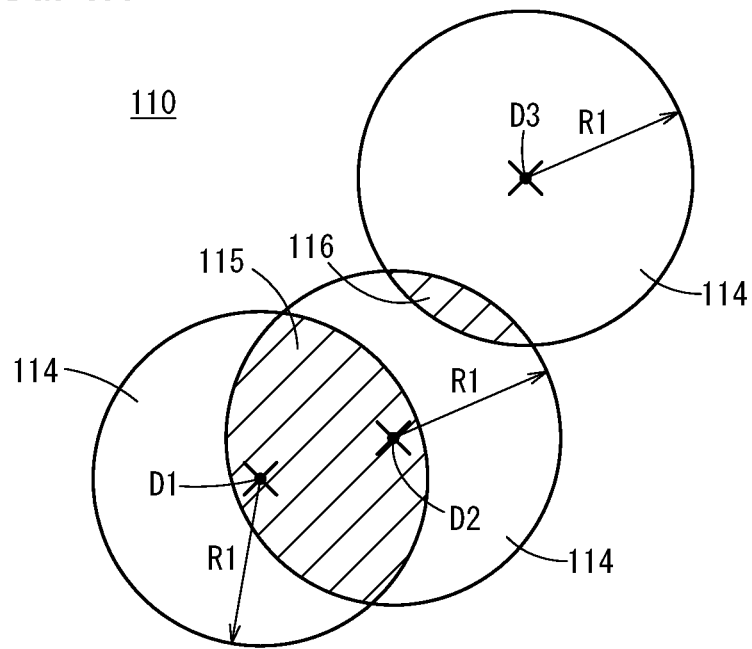
FIG. 6A is a diagram illustrating how an overlap between objects is determined.

As shown in FIG. 6A, three circle regions 114 centered at the positions of objects D1, D2, D3 respectively and all having the radius R1 are defined on the virtual space 110. In the relationship between objects D1 and D2, the corresponding two circle regions 114, 114 have a partial overlapping portion 115 (the hatched region). In the relationship between objects D2 and D3, the corresponding two circle regions 114, 114 have a partial overlapping portion 116 (the hatched region).

Similarly for the other objects, when at least one circle region 114 is in an overlapping positional relationship with a certain circle region 114, these objects (here, objects D1-D3) are classified as one group.

Figure 6B:
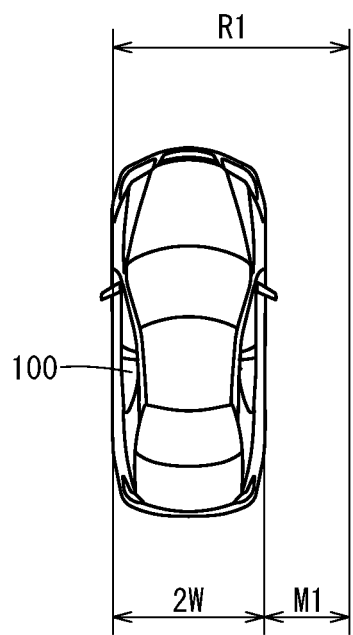
FIG. 6B is a diagram illustrating how the radius of circle regions shown in FIG. 6A is set.

As shown in FIG. 6B, the radius R1 is the sum of the vehicle width 2·W of the vehicle 100 and a certain margin value M1. This means the vehicle 100 is considered to be able to pass through the clearance between objects if the interval between them is larger than R1, whereas the vehicle 100 is unable to pass through the clearance between objects if the interval between them is equal to or smaller than R1. The radius R1 is not necessarily based on the vehicle width but may be set in accordance with the geometry of the vehicle 100 as desired, including the vehicle length or a combination of the vehicle width and the vehicle length.

Figure 7:
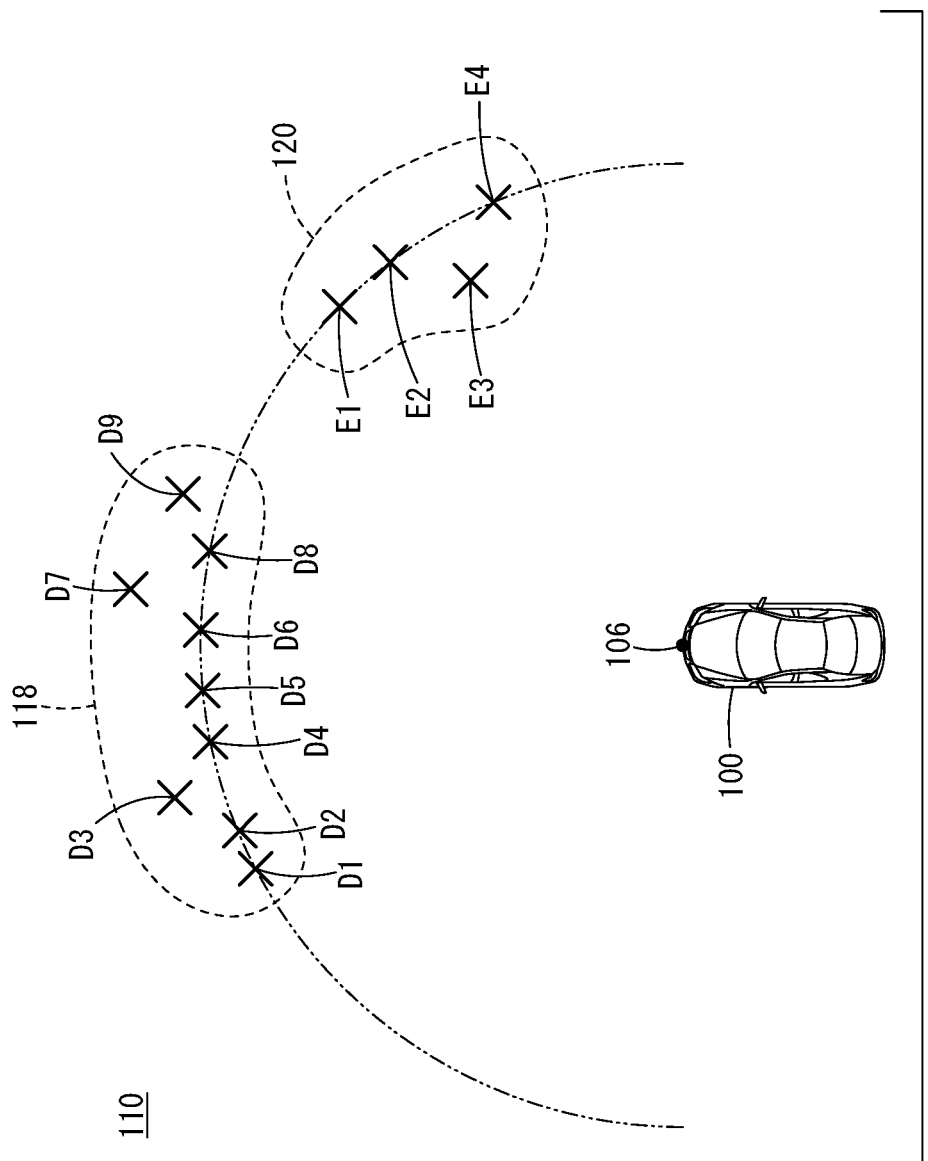
FIG. 7 is a diagram showing a result of classifying multiple objects into two unified groups.

As shown in FIG. 7, the 13 objects forming the object set 112 are classified into a unified group 118 consisting of nine objects present ahead of the vehicle 100 and a unified group 120 consisting of four objects present diagonally right ahead of the vehicle 100. In the following, for convenience of description, the nine objects belonging to the unified group 118 will be denoted as "objects D1-D9" and the four objects belonging to the unified group 120 will be denoted as "objects E1-E4".

In this manner, the unified object forming unit 84 may define multiple circle regions 114 having the same radius R1 and centered at the positions of the respective objects D1-D9, E1-E4, and form the unified object U1, U2 by unifying together two or more objects that have the overlapping portion 115, 116 of the circle regions 114. This enables objects to be grouped together by a simple computation method.

The unified object forming unit 84 may also set a predetermined distance range (the radius R1 of the circle region 114) in accordance with the geometry of the vehicle 100 and form the unified object U1, U2. Fine-granularity prediction can be performed given the trend that the result of determination as to whether the vehicle 100 can pass through the clearance between objects or not varies depending on the geometry of the vehicle 100.

[2] Next, the unified object forming unit 84 extracts representative objects from the two or more objects D1-D9, E1-E4 making up the respective unified groups 118, 120 at predetermined angle intervals with respect to an angular direction centered at the detection reference position 106. Here, "representative objects" are key objects for determining the vertices Vd1-Vd7, Ve1-Ve7 of each polygon (FIG. 12); the positions of these representative objects characterize the shape of a polygon.

Figure 8:
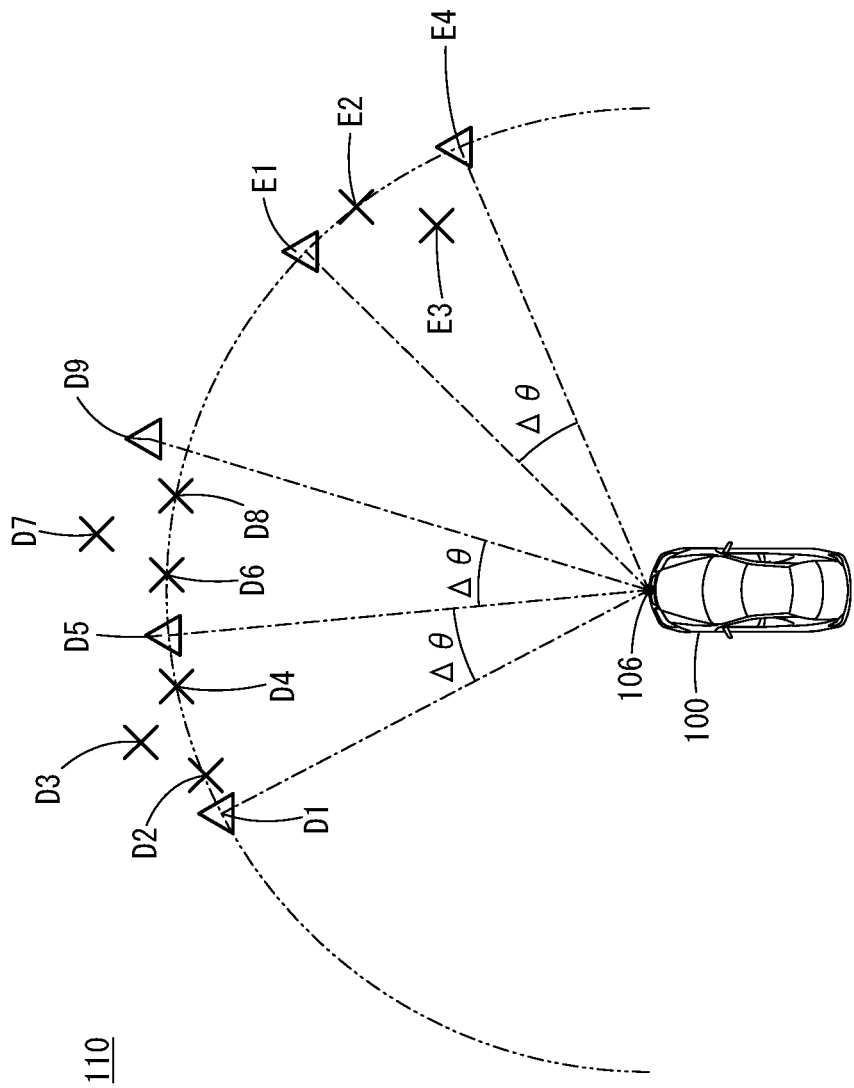
FIG. 8 is a diagram illustrating how representative objects are extracted in each unified group.

As shown in FIG. 8, in the virtual space 110, an angular direction (θ) referenced to the centerline of the vehicle body of the vehicle 100 is defined. For example, the clockwise (rightward turning) direction is defined as "positive direction" and the counterclockwise (leftward turning) direction is defined as "negative direction". In this diagram, representative objects are indicated by "Δ" for clear distinction from the other objects "x".

Among the objects D1-D9 belonging to the unified group 118, the object D1 located at the smallest angle (in the negative direction), the object D9 located at the largest angle (in the positive direction), and the object D5 located at an intermediate position between the objects D1 and D9 are extracted as representative objects. Similarly, among the objects E1-E4 belonging to the unified group 120, the object E1 located at the smallest angle (in the negative direction) and the object E4 located at the largest angle (in the positive direction) are extracted as representative objects.

Here, the angle interval between neighboring representative objects, specifically, (1) representative objects D1 and D5, (2) representative objects D5 and D9, and (3) representative objects E1 and E4, is each a value equal to $\Delta\theta$ (for example, 10 [deg]) or a value close to $\Delta\theta$. $\Delta\theta$ indicates the detection resolution in the angular direction at which the outside state detection unit 80 can identify objects from each other.

In this manner, the unified object forming unit 84 may extract representative objects D1, D5, D9, E1, E4 from the two or more objects D1-D9, E1-E4 making up the unified object U1, U2 at the predetermined angle intervals $\Delta\theta$ with respect to the angular direction ($\theta$) centered at the position of the vehicle 100 (the detection reference position 106) and determine at least two vertices to form a polygon from the positions of the representative objects. This allows polygon vertices to be arranged at positions located at the predetermined angle intervals $\Delta\theta$.

The unified object forming unit 84 may also set the predetermined angle interval $\Delta\theta$ in accordance with the detection performance of the outside state detection unit 80 and determine at least two vertices to form a polygon. Polygon vertices can be arranged at appropriate positions given the trend that the detection resolution in the angular direction at which objects can be identified from each other varies depending on the detection performance of the outside state detection unit 80.

[3] Next, the unified object forming unit 84 additionally extracts representative objects from the remaining objects (D2-D4, D6-D8, E2, E3) if necessary.

Figure 9:
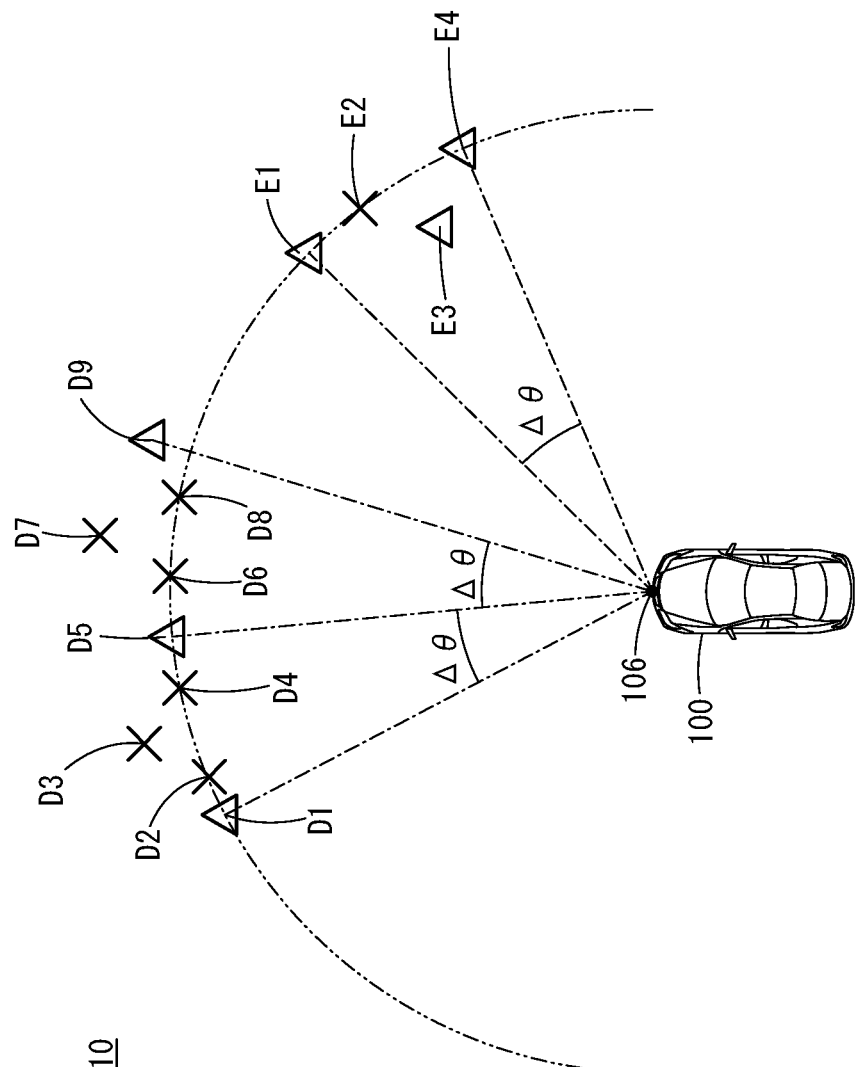
FIG. 9 is a diagram illustrating how representative objects are additionally extracted.

As shown in FIG. 9, the object E3 is at the closest position to the vehicle 100 among the objects E1-E4 belonging to the unified group 120. In this case, the object E3, which has not been extracted yet, is newly added as a representative object in addition to the two representative objects E1, E4 already extracted.

In this manner, the unified object forming unit 84 may extract the object E3 located relatively close to the vehicle 100 as a representative object from the two or more objects D1-D9, E1-E4 making up the unified object U1, U2 and determine at least one vertex to form a polygon from the position of the representative object. This can incorporate the presence of an object that is of great interest in terms of the positional relationship with the vehicle 100 into the shape of a boundary 136, 138 of each polygon.

[4] Next, the unified object forming unit 84 determines some portions of the boundary 136, 138 of each polygon (FIG. 12) based on the positions of the extracted representative objects (the three in the unified group 118 and the three in the unified group 120).

Figure 10A:
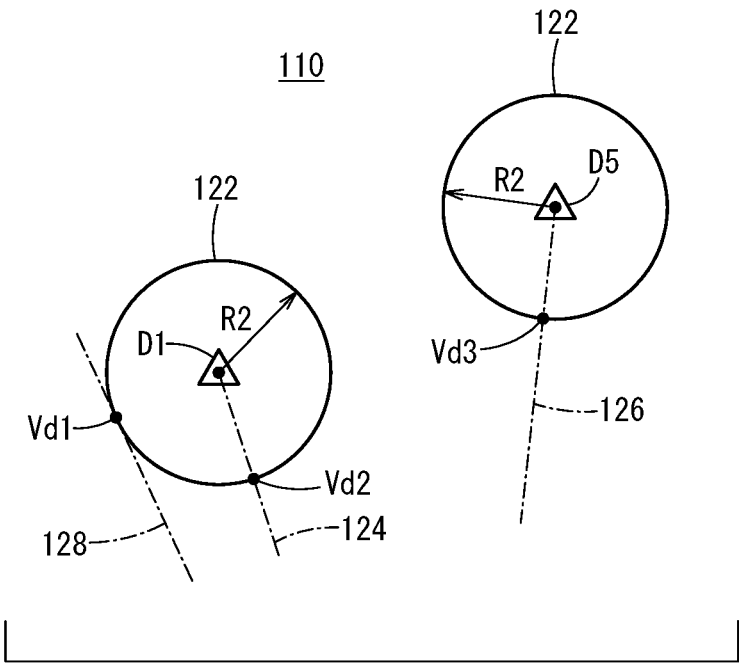
FIG. 10A is a diagram illustrating how vertices on a near side and a far side are determined.

As shown in FIG. 10A, on the virtual space 110, two circles 122 centered at the positions of representative objects D1, D5 respectively and both having a radius R2 are drawn. A segment 124 is a straight line whose one end is at the detection reference position 106 and whose other end is at the position of the representative object D1. A segment 126 is a straight line whose one end is at the detection reference position 106 and whose other end is at the position of the representative object D5. A segment 128 is a straight line passing through the detection reference position 106 and tangent to the circle 122 corresponding to the representative object D1 (a so-called tangent line).

Figure 10B:
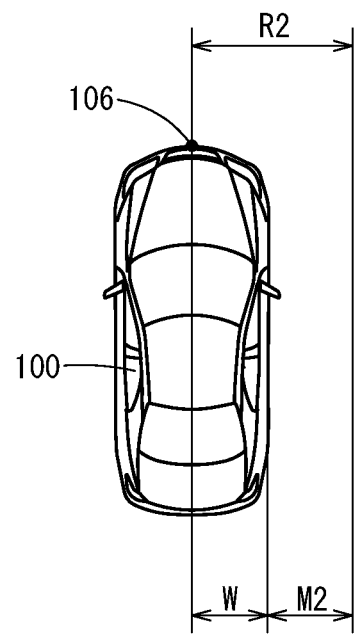
FIG. 10B is a diagram illustrating how the radius of the circles shown in FIG. 10A is set.

As shown in FIG. 10B, the radius R2 is the sum of half the vehicle width, W, of the vehicle 100 and a certain margin value M2. That is, when the centerline of the vehicle body is the reference, the radius R2 is considered to be the minimum width required for preventing an edge of the vehicle 100 in the vehicle width direction (here, the right edge) from contacting the representative object D1. The radius R2 is not necessarily based on the vehicle width but may be set in accordance with the geometry of the vehicle 100 as desired, including the vehicle length or a combination of the vehicle width and the vehicle length.

Figure 11:
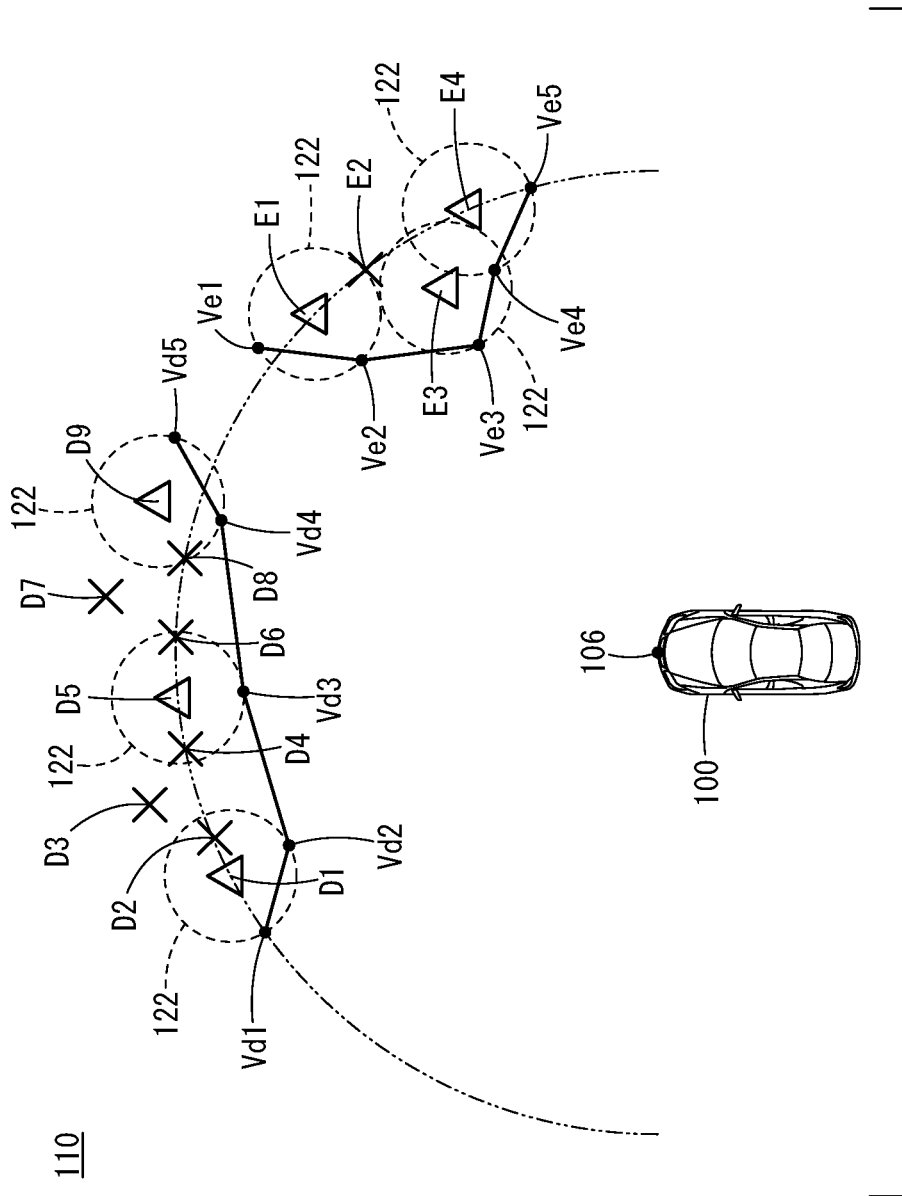
FIG. 11 is a diagram showing a result of determining some portions of boundaries of polygons.

As shown in FIG. 11, some of the vertices of the polygon corresponding to the unified group 118 are determined. A vertex Vd1 is a point which is on the circle 122 centered at the position of the representative object D1 corresponding to the extreme end in the angular direction (the negative direction) and is at a position representing the smallest angle. A vertex Vd2 is a point which is on the circle 122 centered at the position of the representative object D1 and is closest to the position of the vehicle 100 (here, the detection reference position 106). A vertex Vd3 is a point which is on the circle 122 centered at the position of the representative object D5 and is closest to the detection reference position 106. A vertex Vd4 is a point which is on the circle 122 centered at the position of the representative object D9 and is closest to the detection reference position 106. A vertex Vd5 is a point which is on the circle 122 centered at the position of the representative object D9 corresponding to the extreme end in the angular direction (the positive direction) and is at a position representing the largest angle.

A vertex Ve1 is a point which is on the circle 122 centered at the position of the representative object E1 corresponding to the extreme end in the angular direction (the negative direction) and is at a position representing the smallest angle. A vertex Ve2 is a point which is on the circle 122 centered at the position of the representative object E1 and is closest to the detection reference position 106. A vertex Ve3 is a point which is on the circle 122 centered at the position of the representative object E3 and is closest to the detection reference position 106. A vertex Ve4 is a point which is on the circle 122 centered at the position of the representative object E4 and is closest to the detection reference position 106. A vertex Ve5 is a point which is on the circle 122 centered at the position of the representative object E4 corresponding to the extreme end in the angular direction (the positive direction) and is at a position representing the largest angle.

In this manner, the unified object forming unit 84 may determine points that are respectively on the circles 122 having the same radius R2 and centered at the positions of the representative objects and that are closest to the position of the vehicle 100 as vertices Vd2-Vd4, Ve2-Ve4 of each polygon. This can provide a boundary 136, 138 capable of covering the entire distance range in which two or more objects are present (the near side from the vehicle 100) and can also keep the distance between each representative object and the boundary 136, 138 at a predetermined value (the radius R2 of the circle 122) or greater without fail.

The unified object forming unit 84 may also determine a point that is on each of the circles having the same radius R2 and centered at the positions of the representative objects corresponding to the extreme end in the angular direction and that is at the position representing either the largest angle or the smallest angle, as a vertex Vd1, Vd5, Ve1, Ve5 of each polygon. This can provide a boundary 136, 138 capable of covering the entire angle range in which two or more objects are present and can also keep the distance between each representative object and the boundary 136, 138 at a predetermined value (the radius R2 of the circle 122) or greater without fail.

[5] Next, the unified object forming unit 84 determines the remaining portions of the boundary 136, 138 of each polygon (FIG. 12) based on the positions of the extracted representative objects (the three in the unified group 118 and the three in the unified group 120).

Figure 12:
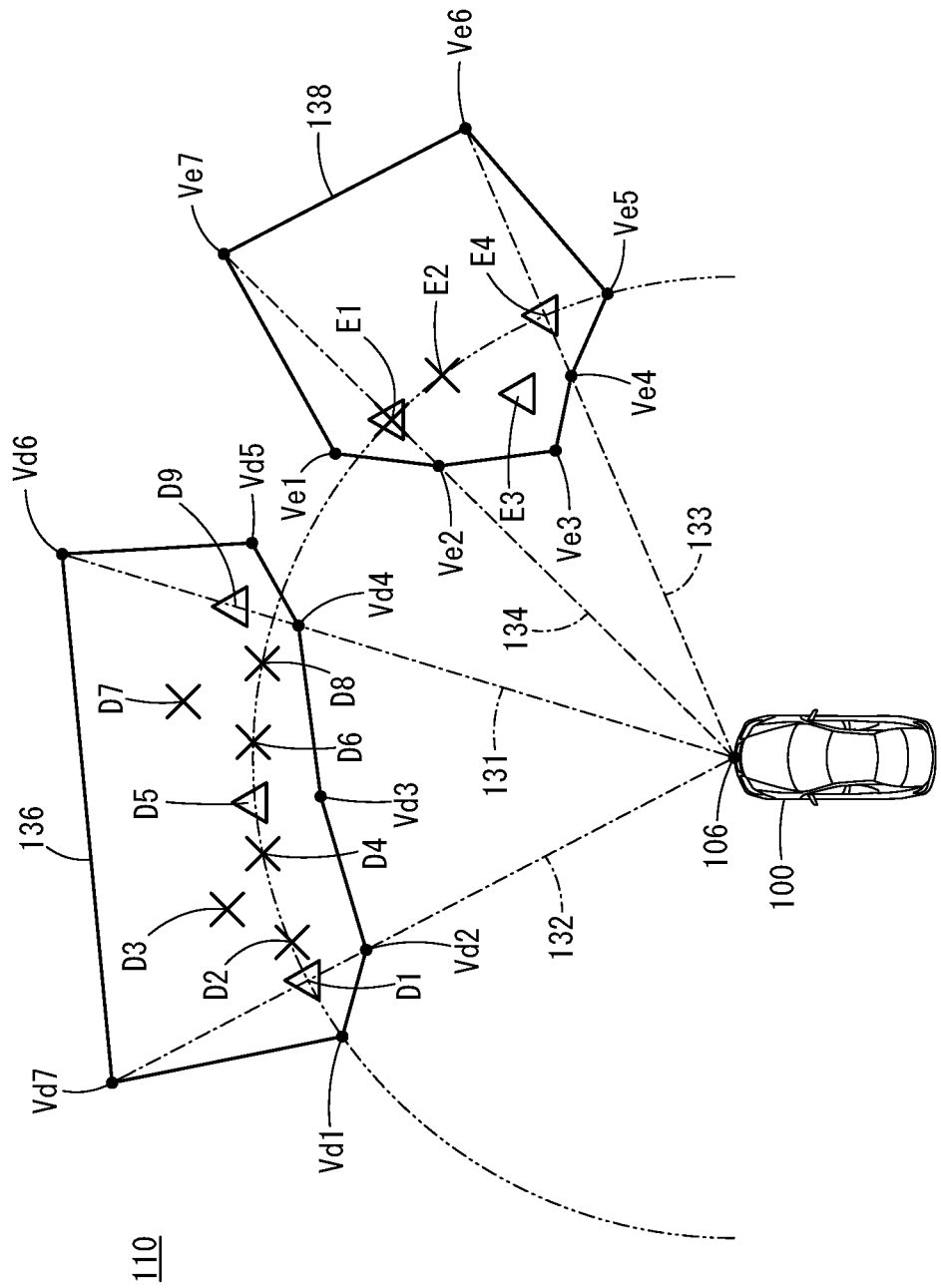
FIG. 12 is a diagram showing a result of determining the entire boundaries of polygons.

As shown in FIG. 12, all the vertices of the polygon corresponding to the unified group 118 are determined. A vertex Vd6 is a point which is on a straight line 131 connecting between (or containing two points of) the position of the representative object D9 corresponding to the extreme end in the angular direction (the positive direction) and the detection reference position 106, and which is located on the far side at a predetermined length from the position of the representative object D9. A vertex Vd7 is a point which is on a straight line 132 connecting between the position of representative object D1 corresponding to the extreme end in the angular direction (the negative direction) and the detection reference position 106, and which is located on the far side at a predetermined length from the position of the representative object D1.

A vertex Ve6 is a point which is on a straight line 133 connecting between the position of representative object E4 corresponding to the extreme end in the angular direction (the positive direction) and the detection reference position 106, and which is located on the far side at a predetermined length from the position of the representative object E4. A vertex Ve7 is a point which is on a straight line 134 connecting between the position of representative object E1 corresponding to the extreme end in the angular direction (the negative direction) and the detection reference position 106, and which is located on the far side at a predetermined length from the position of the representative object E1.

For the unified group 118, a heptagonal boundary 136 is defined by sequentially connecting the determined vertices Vd1-Vd7 with segments. Similarly, for the unified group 120, a heptagonal boundary 138 is defined by sequentially connecting the determined vertices Ve1-Ve7 with segments. In summary, the unified object forming unit 84 unifies particular objects in the object set 112 (FIG. 5) together to form unified objects U1, U2 as integrated items.

Here, the unified object forming unit 84 may determine at least one point that is on the far side relative to the positions of all the objects D1-D9, E1-E4 that make up the unified object U1, U2, as a vertex Vd6, Vd7, Ve6, Ve7 of each polygon. This provides a boundary 136, 138 capable of covering the entire distance range in which two or more objects are present (the far side from the vehicle 100).

The unified object forming unit 84 may also determine, as a vertex Vd6, Vd7, Ve6, Ve7 of each polygon, a point that is on the straight line 131-134 connecting between the position of the representative object corresponding to the extreme end in the angular direction (θ) and the position of the vehicle 100 and that is located on the far side at a predetermined length from the position of the representative object. This provides a boundary 136, 138 capable of covering the entire angle range in which two or more objects are present (here, the far side from the vehicle 100).

At step S4 in FIG. 3, the information combining unit 86 generates local environment map information Iem by combining various kinds of information, including object information (the recognition result at step S2 and the formation result at step S3) as well as traffic lane information. Note that this local environment map information Iem includes object information on individual objects in [1] the unified object U1, [2] the unified object U2, and [3] the object set 112, excluding objects D1-D9, E1-E4.

At step S5 in FIG. 3, the interference potential prediction unit 88 predicts the possibility that the object set 112 contacts or approaches the vehicle 100 using the local environment map information Iem resulting from the combining at step S4. Here, in a case where the unified object U1, U2 has been formed, the interference potential prediction unit 88 predicts the possibility that the unified object U1, U2 contacts or approaches the vehicle 100, instead of the respective objects D1-D9, E1-E4 that make up the unified object U1, U2.

Figure 13:
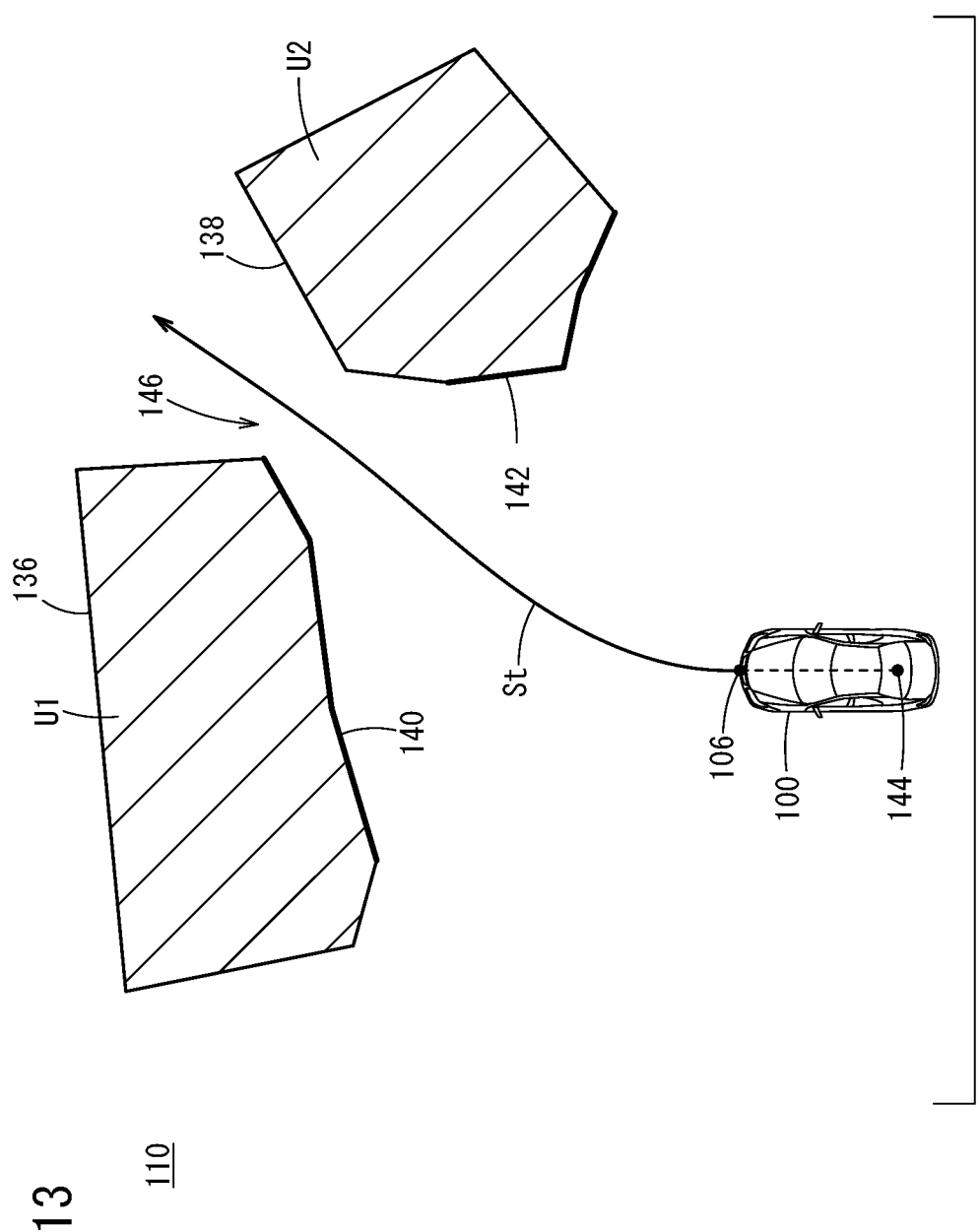
FIG. 13 is a schematic diagram showing how a short-term trajectory is determined.

As shown in FIG. 13, on the virtual space 110, two unified objects U1, U2, both of a heptagonal shape, are arranged. Of the boundary 136 of the unified object U1, the portion indicated by a bold line is a portion that faces the vehicle 100 (hereinafter, a facing portion 140). Of the boundary 138 of the unified object U2, the portion indicated by a bold line is a portion that faces the vehicle 100 (hereinafter, a facing portion 142).

Here, the interference potential prediction unit 88 may predict the possibility of contact with or approach to the vehicle 100 from the positional relationship between the vehicle 100 and the portion of the boundary 136, 138 of the unified object U1, U2 that faces the vehicle 100 (the facing portion 140, 142). Using a portion of the boundary 136, 138 of the unified object U1, U2 that is most effective for the determination of interference potential, computation time is shortened and the determination can be completed correspondingly earlier.

In particular, the boundary 136, 138 that satisfies the relation of magnitude: R2>W (FIG. 10B) and takes the vehicle width of the vehicle 100 into consideration beforehand has been provided. This allows interference potential for the unified object U1, U2 to be predicted and evaluated on the assumption that the vehicle 100 is of a point shape and based on their positional relationship with a linear travel trajectory.

At step S6 in FIG. 3, the short-term trajectory generation unit 73 (or the middle-term trajectory generation unit 72) generates a short-term trajectory St (or a middle-term trajectory Mt) for use in behavior control on the vehicle 100 based on the prediction result at step S5. Subsequently, the vehicle control unit 60 controls the behavior of the vehicle 100 based on the short-term trajectory St generated by the short-term trajectory generation unit 73, in other words, in accordance with the prediction result obtained by the interference potential prediction unit 88.

The short-term trajectory St shown in FIG. 13 indicates a trajectory that permits the vehicle 100 at a host vehicle position 144 to pass through a clearance 146 between the unified objects U1 and U2 smoothly. As a result, the vehicle 100 can smoothly travel on the lane 102 while avoiding contact with the multiple pylons 104 (FIG. 4) under automated driving control by the vehicle control unit 60.

Effects of the Present Vehicle Control Apparatus 10

As described above, the vehicle control apparatus 10 includes [1] the outside state detection unit 80 configured to detect an outside state of the vehicle 100, [2] the object recognition unit 82 configured to recognize the one or more objects D1-D9, E1-E4 based on a detection result obtained by the outside state detection unit 80, and [3] the interference potential prediction unit 88 configured to predict a possibility that the recognized objects D1-D9, E1-E4 contact or approach the vehicle 100.

The vehicle control apparatus 10 further includes [4] the unified object forming unit 84 configured to form as an integrated item, the unified object U1, U2, the boundary 136, 138 of which is determined from positional relationship between two or more objects that are present within the predetermined distance range (R1) among the plurality of objects D1-D9, E1-E4, and [5] the interference potential prediction unit 88 is configured to predict a possibility that the unified object U1, U2 contacts or approaches the vehicle 100, instead of the respective objects D1-D9 (E1-E4) that make up the unified object U1, U2.

A vehicle control method using the vehicle control apparatus 10 causes one or more computers to perform [4] a forming step (S3) of forming, as an integrated item, the unified object U1, U2, the boundary 136, 138 of which is determined from positional relationship between two or more objects that are present within a predetermined distance range (R1) among the plurality of objects D1-D9, E1-E4, and [5] a prediction step (S5) of predicting a possibility that the unified object U1, U2 contacts or approaches the vehicle 100, instead of the respective objects D1-D9 (E1-E4) that make up the unified object U1, U2.

Such a configuration enables prediction of the possibility of interference (contact or approach) with the vehicle 100 using the unified object U1, U2 having the boundary 136, 138 that takes into account the positional relationship between two or more objects present in the predetermined distance range (R1). This allows for fine-granularity prediction of interference potential while taking advantage of the convenience of grouping objects together.

It is particularly preferable that the unified object forming unit 84 form the unified object U1, U2 that encompasses all of the objects D1-D9 and objects E1-E4 respectively and has a polygon shape. This is because the boundary 136, 138 of each polygon is an aggregate of multiple straight line components and thus the amount of computation required for determining the interference potential is reduced.

IMPROVEMENT EXAMPLES

Some improvement examples of the way of determining a boundary (FIG. 12) are described below with reference to FIGS. 14, 15A, and 15B.

First Improvement Example

Figure 14:
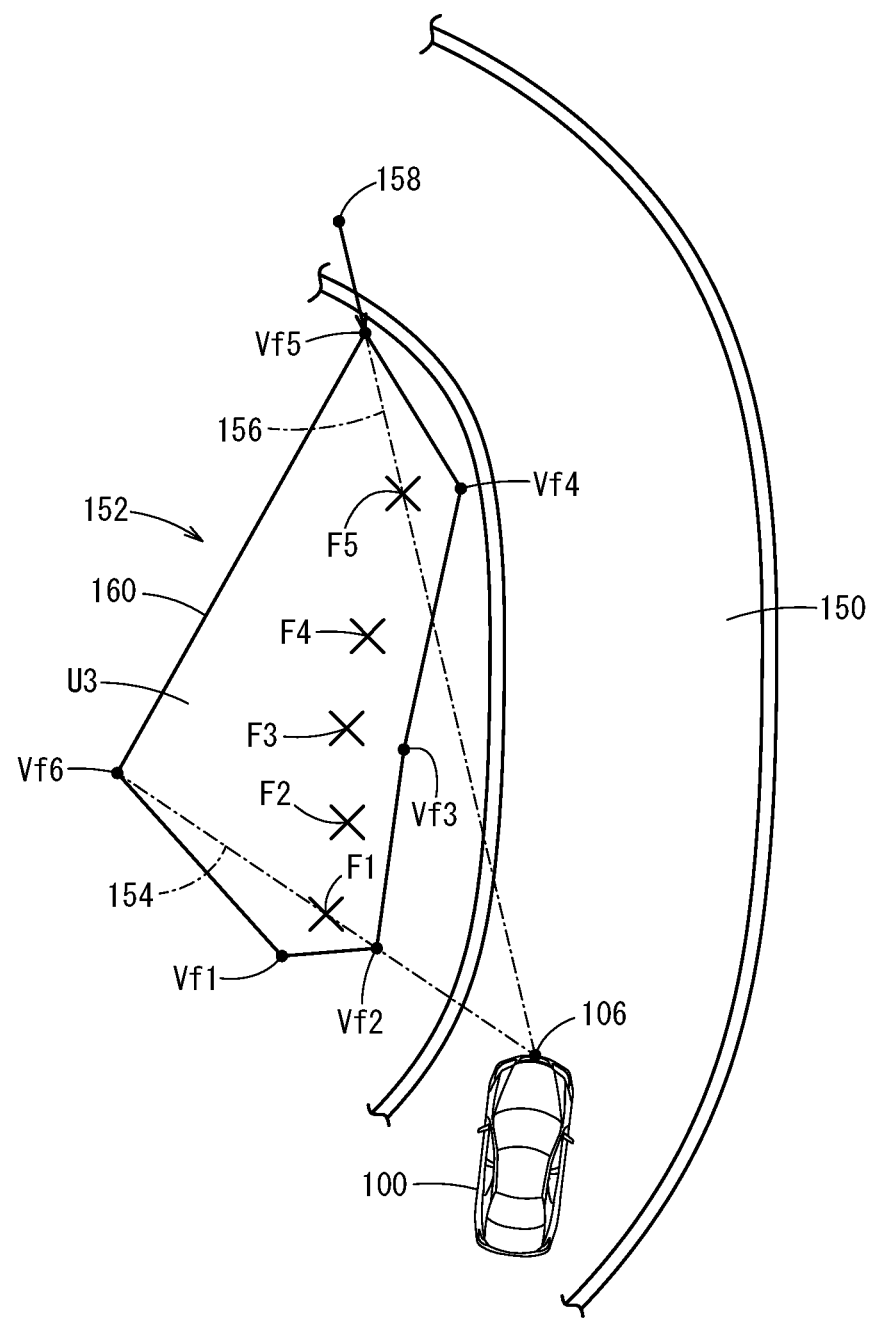
FIG. 14 is a diagram showing a first improvement example relating to the way of determining vertices on the far side.

As shown in FIG. 14, assume a case where the vehicle 100 is traveling on a lane 150 curved in a reverse C-shape. In an extra-lane region 152 on the inner side of the curve of the lane 150, five objects F1-F5 (indicated by symbol "x") are placed. It is assumed that the grouping described above (that is, forming of a unified object U3) is possible since the five objects F1-F5 satisfy a predetermined positional relationship.

Vertices Vf1, Vf2 are two points determined from the position of a representative object F1. A vertex Vf3 is a point determined from the position of the representative object F3. A vertex Vf4 is a point determined from the position of the representative object F5. A vertex Vf6 is a point which is on a straight line 154 connecting between the position of the representative object F1 corresponding to the extreme end in the angular direction (the negative direction) and the detection reference position 106, and which is located on the far side at a predetermined length from the position of the representative object F1.

A vertex candidate 158 is a point which is on a straight line 156 connecting between the position of the representative object F5 corresponding to the extreme end in the angular direction (the positive direction) and the detection reference position 106, and which is located on the far side at a predetermined length from the position of the representative object F5. However, because the vertex candidate 158 is located on the lane 150, it can unnecessarily limit the travel-available range for the vehicle 100.

Accordingly, when the point (the vertex candidate 158) that is located on the far side at the predetermined length from the position of the representative object F5 lies on the lane 150 on which the vehicle 100 is to travel, the unified object forming unit 84 may determine another point that does not lie on the lane 150 as a vertex Vf5 of a polygon by decreasing the predetermined length. This can prevent the range defined by a boundary 160 from unnecessarily expanding to another portion on the lane 150.

Second Improvement Example

Figure 15A:
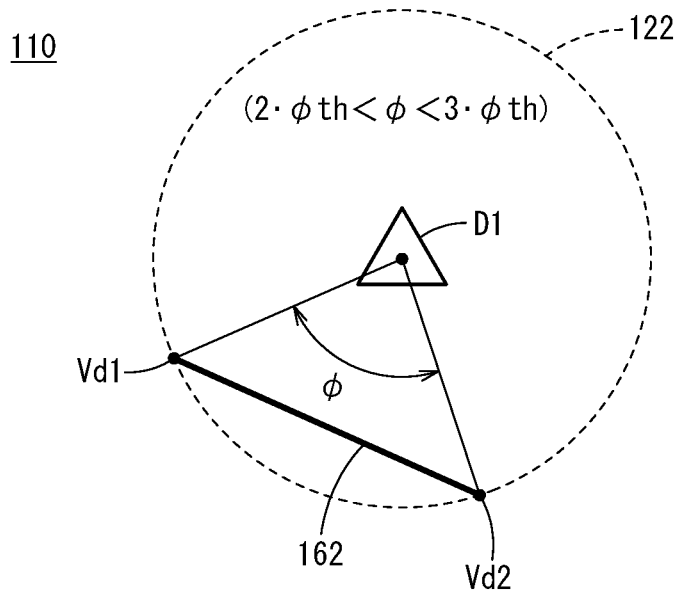
FIGS. 15A and 15B are diagrams showing a second improvement example relating to the way of determining vertices on the near side.

As shown in FIG. 15A, one circle 122 (with the radius R2) centered at the position of the representative object D1 is drawn on the virtual space 110. Vertices Vd1, Vd2 are points defined in a similar manner to the case of FIG. 10A. Here, the central angle of the sector formed by the vertices Vd1 and Vd2 is defined as $\phi$.

For example, in a case where the two vertices Vd1 and Vd2 are connected in the form of a straight line when determining the boundary 136 (FIG. 12), there is a trend of the sector region being represented less faithfully as the value of the central angle $\phi$ is greater. Then, due to the presence of a portion with a shorter distance between the representative object D1 and a partial boundary 162 (the midpoint of the partial boundary 162), interference with the unified object U1 could possibly happen contrary to a prediction result.

Accordingly, the unified object forming unit 84 may interpolate between the two vertices Vd1 and Vd2 along the arc with regard to the representative object D1 and add polygon vertices Vd8, Vd9. In this case, one or more interpolation points are added so that the central angle $\phi$ formed by neighboring vertices does not exceed a threshold $\phi$th. The threshold $\phi$th is a preset positive value (for example, $\phi$th=45 [deg]).

For example, a determination rule of "equally dividing the central angle $\phi$ such that the resulting angle does not exceed the threshold $\phi$th and is closest to the threshold $\phi$th" may be applied. When the central angle $\phi$ and the threshold $\phi$th satisfy the relation of magnitude: $2 \cdot \phi th < \phi < 3 \cdot \phi th$, the central angle $\phi$ may be divided into three.

Figure 15B:
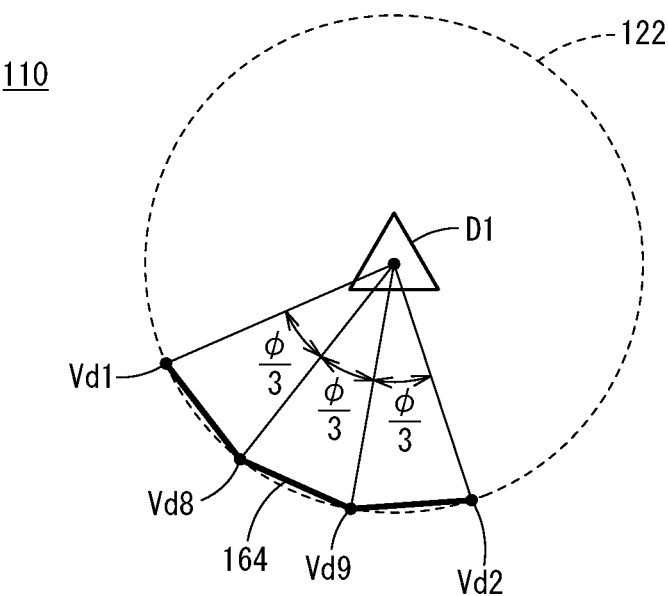

As shown in FIG. 15B, four vertices Vd1, Vd8 (an interpolation point), Vd9 (an interpolation point), and Vd2 each having a sector central angle of ($\phi$/3) are arranged on the circle 122. By sequentially connecting the determined vertices Vd1, Vd8, Vd9, Vd2 with segments, a partial boundary 164 conforming to the shape of the circle 122 is defined.

In this manner, when multiple vertices Vd1, Vd2 are present on the circle 122 centered at the position of the representative object D1 corresponding to the extreme end in the angular direction, the unified object forming unit 84 may determine one or more interpolation points obtained by interpolating between the neighboring vertices Vd1 and Vd2 in an arc shape (arc interpolation) as the vertices Vd8, Vd9 of a polygon. This can suppress formation of a portion with a shorter distance between the representative object D1 and the partial boundary 164 from the perspective of angle resolution.

Although the representative object D1 was described in the above example, other representative objects D9, E1, E4 corresponding to the extreme end in the angular direction may be handled in a similar manner.

Supplementary Note

It will be apparent that the present invention is not limited to the above embodiment but may be subjected to any modification as desired without departing from the scope of the invention.

For example, the way of determining the boundary 136, 138, 160 is not limited to the above-described embodiment and the improvement examples but any technique based on the positional relationship between two or more objects may be employed. Also, the shape of a unified object may be a polygon with six or less vertices or eight or more vertices aside from a heptagon, or may be any geometric shape including a circle and an ellipse, for example.

The invention claimed is:

1. A vehicle control apparatus comprising one or more processors, wherein the one or more processors:
   recognize one or more objects based on a detection result obtained by an outside sensor configured to detect an outside state of a vehicle;
   predict a possibility that the one or more objects recognized contact or approach the vehicle; and
   form as an integrated item, a unified object, a boundary of which is determined from positional relationship between two or more objects that are present within a predetermined distance range among the one or more objects recognized,
   in predicting the possibility that the one or more objects recognized contact or approach the vehicle, the one or more processors predict the possibility that the unified object formed contacts or approaches the vehicle, instead of respective objects that make up the unified object, and
   in forming the unified object, the one or more processors extract representative objects from the two or more objects making up the unified object at predetermined angle intervals with respect to an angular direction centered at a position of the vehicle, and determine at least two vertices to form a polygon from positions of the representative objects.

2. The vehicle control apparatus according to claim 1, wherein in forming the unified object, the one or more processors set the predetermined distance range in accordance with a geometry of the vehicle and form the unified object.

3. The vehicle control apparatus according to claim 1, wherein in forming the unified object, the one or more processors define a plurality of circle regions having a same radius and centered at positions of the respective objects, and form the unified object by unifying together two or more objects that have an overlapping portion of the circle regions.

4. The vehicle control apparatus according to claim 1, wherein in forming the unified object, the one or more processors form the unified object that encompasses all of the two or more objects present in the predetermined distance range and has a polygon shape.

5. The vehicle control apparatus according to claim 1, wherein in forming the unified object, the one or more processors set the predetermined angle intervals in accordance with a detection performance of the outside sensor and determine at least two vertices to form the polygon.

6. The vehicle control apparatus according to claim 1, wherein in forming the unified object, the one or more processors determine points that are respectively on circles centered at the positions of the representative objects and that are closest to the position of the vehicle as vertices of the polygon.

7. The vehicle control apparatus according to claim 6, wherein in forming the unified object, the one or more processors determine as a vertex of the polygon, a point that is on the circle centered at the position of each of the representative objects corresponding to an extreme end in the angular direction and that is at a position representing either a largest angle or a smallest angle.

8. The vehicle control apparatus according to claim 7, wherein when a plurality of vertices of the polygon are present on the circle centered at the position of the representative object corresponding to the extreme end in the angular direction, in forming the unified object, the one or more processors determine one or more interpolation points obtained by interpolating between neighboring vertices in an arc shape as vertices of the polygon.

9. The vehicle control apparatus according to claim 1, wherein in predicting the possibility that the one or more objects recognized contact or approach the vehicle, the one or more processors predict the possibility of contact with or approach to the vehicle from a positional relationship between the vehicle and a portion of the boundary of the unified object, the portion facing the vehicle.

10. The vehicle control apparatus according to claim 1, wherein the one or more processors further control a behavior of the vehicle in accordance with a prediction result obtained in predicting the possibility that the one or more objects recognized contact or approach the vehicle.

11. A vehicle control apparatus comprising one or more processors, wherein the one or more processors:
    recognize one or more objects based on a detection result obtained by an outside sensor configured to detect an outside state of a vehicle;
    predict a possibility that the one or more objects recognized contact or approach the vehicle; and
    form as an integrated item, a unified object, a boundary of which is determined from positional relationship between two or more objects that are present within a predetermined distance range among the one or more objects recognized,
    in predicting the possibility that the one or more objects recognized contact or approach the vehicle, the one or more processors predict the possibility that the unified object formed contacts or approaches the vehicle, instead of the respective objects that make up the unified object,
    in forming the unified object, the one or more processors form the unified object that encompasses all of the two or more objects present in the predetermined distance range and has a polygon shape, and
    in forming the unified object, the one or more processors extract an object located relatively close to the vehicle from the two or more objects making up the unified object as a representative object and determine at least one vertex to form the polygon from a position of the representative object.

12. A vehicle control apparatus comprising one or more processors, wherein the one or more processors:
    recognize one or more objects based on a detection result obtained by an outside sensor configured to detect an outside state of a vehicle;

predict a possibility that the one or more objects recognized contact or approach the vehicle; and form as an integrated item, a unified object, a boundary of which is determined from positional relationship between two or more objects that are present within a predetermined distance range among the one or more objects recognized, in predicting the possibility that the one or more objects recognized contact or approach the vehicle, the one or more processors predict the possibility that the unified object formed contacts or approaches the vehicle, instead of the respective objects that make up the unified object, in forming the unified object, the one or more processors form the unified object that encompasses all of the two or more objects present in the predetermined distance range and has a polygon shape, and in forming the unified object, the one or more processors determine at least one point that is on a far side relative to the positions of all objects that make up the unified object as a vertex of the polygon.

13. The vehicle control apparatus according to claim 12, wherein in forming the unified object, the one or more processors determine as a vertex of the polygon, a point that is on a straight line connecting between the position of a representative object corresponding to a extreme end in an angular direction and the position of the vehicle and that is located on the far side at a predetermined length from the position of the representative object.

14. The vehicle control apparatus according to claim 13, wherein when a point that is located on the far side at a predetermined length from the position of the representative object lies on a lane on which the vehicle is to travel, in forming the unified object, the one or more processors determine another point that does not lie on the lane as a vertex of the polygon by decreasing the predetermined length.

* * * * *